Nov. 20, 1962
R. M. HURD ET AL 3,065,365
ELECTRO-OSMOSIS DRIVER UNIT COMBINED WITH ELECTROLYTIC
DETECTOR FOR TAKING DERIVATIVES
Filed Nov. 30, 1955
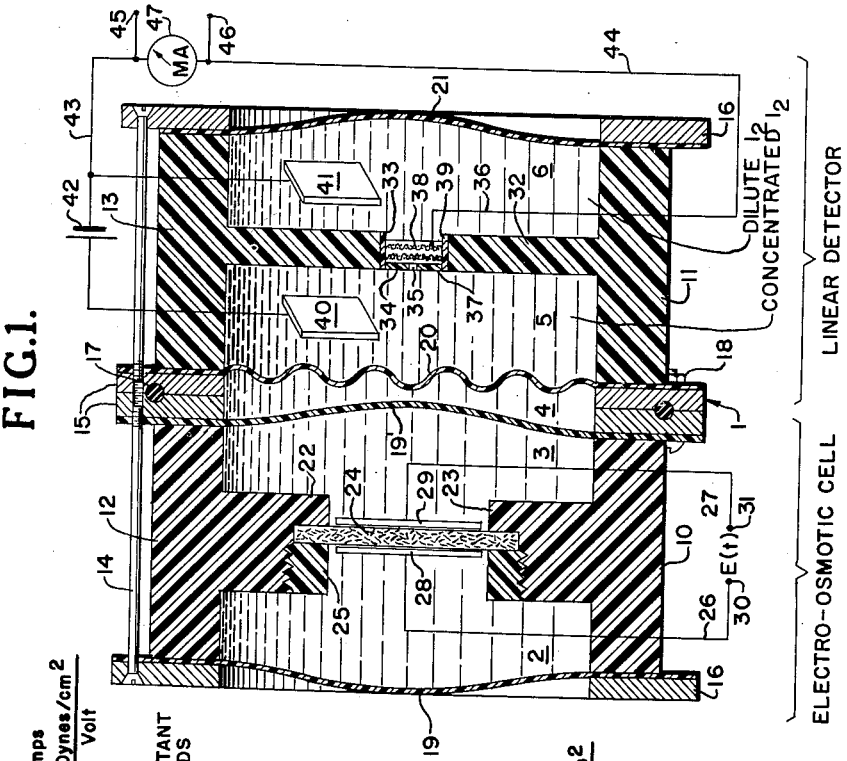
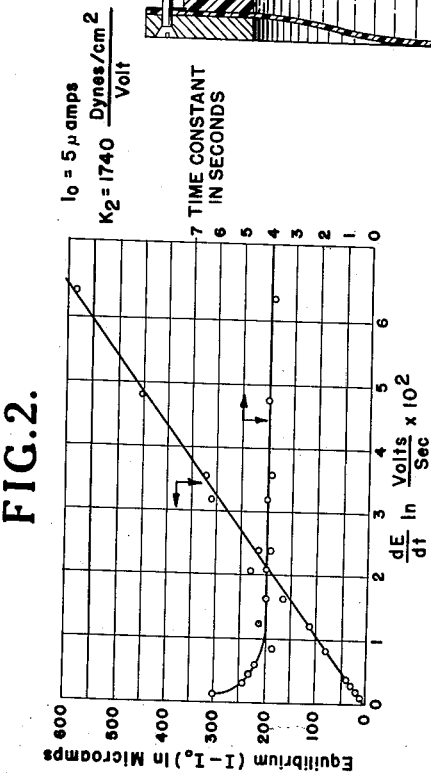
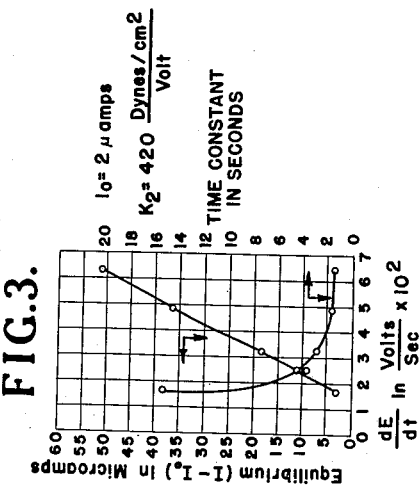
INVENTORS
R. M. HURD
G. T. KEMP
BY
ATTORNEYS

United States Patent Office 3,065,365
Patented Nov. 20, 1962

3,065,365
ELECTRO-OSMOSIS DRIVER UNIT COMBINED WITH ELECTROLYTIC DETECTOR FOR TAKING DERIVATIVES
Ray M. Hurd, Austin, and George T. Kemp, Paint Rock, Tex., assignors, by mesne assignments, to the United States of America as represented by the Secretary of the Navy
Filed Nov. 30, 1955, Ser. No. 550,230
9 Claims. (Cl. 310—2)

This invention relates to a device for taking the time derivative of a small electrical current by electrolytic means. More specifically, the invention relates to the new and novel combination of an electro-osmosis driver unit and an electrolytic detector of linear characteristics for taking the time derivative of an electrical current by electrolytic and hydraulic means.

The system of the instant invention is somewhat analogous to an electrical circuit including a fluctuating voltage source of direct current potential and a circuit therefor including a series resistance and a series capacitance wherein all elements are of the linear type. The analogous current charging the analogous capacitor is an imperfect time derivative of the analogous potential.

In a device of the instant invention a linear relationship is obtained between the voltage applied to the electro-osmotic cell and the pressure of the fluid therein. By combining an electro-osmotic cell and a linear electrolytic detector of the character herein to be described, an output current relationship is obtained in an overall combination of these devices which is a linear relation with respect to the fluid velocity or the volumetric flow of fluid in the system until an equilibrium condition is approached.

The electro-osmotic cell of the instant invention is of a character incorporating a housing having a fritted filter glass partition disposed transversely of the central portion thereof to provide a pair of enclosed volumes which are in fluid communication through the plurality of capillaries of the fritted glass or other suitable porous ceramic disc. The device is provided with a pair of electrodes in close adjacency with the filter disc and terminating in external connections across which the direct current input potential is applied. It is well known in the art that when a potential is applied across the plates or electrodes of an electro-osmotic cell there occurs a flow of the contained liquid. This liquid may be distilled water or any other fluid suitable for the purpose such for example as acetone or acetonitrile. This fluid flow effects a distending of one of the pair of flexible diaphragms which constitute the outer walls of the contained volume. The polarity of the applied potential determines the direction of fluid flow.

The electro-osmotic cell construction comprises a pair of diaphragms of suitable resilience disposed across the opposite ends of the cell in a manner to enclose both of said volumes in the housing. The electro-osmotic device is well adapted for coupling at one of the diaphragms to drive directly a linear electrolytic detector.

The linear detector may also be assembled as a complete assembly and arranged in spaced relation with respect to the electro-osmotic driver in which case the final assembly of the two cell units is made by simultaneously immersing the two cell units and fixing the joint underwater in a manner whereby the intervening space between the two cell assemblies is completely filled with water. This provides an additional closed volume which as aforesaid is completely filled with a liquid such as distilled water to provide a fluid driving arrangement for the diaphragm of the detector cell from the diaphragm of the electro-osmotic cell. The linear detector to which the electro-osmotic cell is coupled comprises at least one substantially rigid diaphragm and a flexible diaphragm in a spaced arrangement to enclose a volume of fluid therebetween.

Disposed in the casing of the detector cell which functions in conjunction with the two diaphragms of this cell to provide a closed volume is a dividing wall or partition substantially separating the device into a pair of fluid chambers in which is contained a solution of iodine iodide, or other applicable oxidation reduction system of ions. Suitable electrodes are provided in the respective chambers and an electrical bias source arrangement connected therebetween to provide for the concentration of $I_2$ molecules of the solution in one chamber and a dilute iodine solution in the the second chamber, there being a means providing fluid and electrolytic communication between the chambers disposed in the intervening wall portion. The wall portion additionally includes a cathode assembly which has a negative polarity with respect to an anode in the chamber driven by the electro-osmotic cell, whereby a flow of electrolyte from the first chamber to the second chamber produces a current and voltage in the external circuit as will hereinafter become apparent.

The arrangement of the system is such that the output current as derived from the two cell combination is a derivative with respect to time of the voltage of the direct current signal applied to the electro-osmotic driver cell.

It is an object of the instant invention to provide an apparatus for taking the time derivative of a small electric current and providing an output therefrom which is proportional to the derivative of the voltage with respect to time.

In conjunction with the foregoing object, it is a further object to obtain an approximate or imperfect derivative by a device of the character to be heinafter described and with a low consumption of electrical power.

Other objects and many of the attendant advantages of this invention will be readily appreciated as the same becomes better understood by reference to the following detailed description when considered in connection with the accompanying drawings wherein:

FIG. 1 is a generally diagrammatic view in vertical section of a combined electro-osmotic driver and linear detector cell of the instant invention;

FIG. 2 is a graphical illustration showing curves comparing the magnitude of output current and time constant of a typical combination of an electro-osmotic cell and linear detector cell for various rates of increase of an applied signal;

FIG. 3 is a curve of generally similar characteristics to that of FIG. 2 and as obtained by a device of a design of the instant invention for operation under different input current characteristics.

Referring now to the drawings and more particularly to FIG. 1 thereof, the combined electro-osmotic driver cell and linear detector cell in accordance with a physical embodiment of the instant invention is indicated generally by reference character 1. The overall system comprises an electro-osmotic device assembly 10 and the linear electrolytic detector 11 the casing of each of which is composed of a plastic material suitable for the purpose such for example as polymonochlorotrifluoroethylene and which as manufactured by the W. Kellog Company of Newark, New Jersey, is known in the trade and hereinafter referred to as Kel-F. This plastic possesses desirable characteristics for this type of application in that it is substantially inert to corrosion by the liquids used for filling the containers and more particularly does not leach out impurities of a detrimental contaminating character to the iodine solution used in the linear detector.

The linear detector cell unit 11 provides for a closed housing 13 of Kel-F for the electrolyte fluid contained therein while the electro-osmotic driver unit 10 is provided with a casing 12 for containing acetone or water.

In a physical embodiment of the device the general structure of which is shown diagrammatically in FIG. 1, the casings 12 and 13 are each provided with a pair of flanges or end ring members preferably of brass and located at 15 and 16; the members 16 being disposed to retain the outer diaphragms 19 and 21 for the respective cells while the other flanges 15 are disposed in abutting engagement with respect to each other to retain the inner closure diaphragms 19' and 20 of the two cells and contain the intermediate fluid at 4. The respective pairs of flanges 15 and 16 are clamped as by a plurality of through bolts 14 or other suitable clamping means prior to the assembly of the two cell units. They are mutually sealed by a neoprene rubber O ring 17 after assembly of the individual cell units. The members 15 are secured and maintained in sealing engagement with the O ring 17 by a plurality of bolts 18 or other suitable sealing arrangements as desired.

The electro-osmotic cell casing 11 is closed by a pair of flexible normally bulged diaphragms 19 and 19' composed of any suitable plastic such for example as a vinylite. The casing 12 is further provided with a centrally disposed integral partition portion 22 extending across the interior of the cell to divide the same generally into a pair of chambers 2 and 3. A centrally disposed opening or orifice for fluid communication between the chambers is provided at 23 and is arranged to receive and seat a fritted glass disc 24, or other porous ceramic or the like, of a character providing a substantially uniform pattern of capillary orifices therethrough by which fluid can move from chamber 2 to chamber 3 when the cell is activated. This disc is retained by a threaded annular plug or retaining ring 25 of Kel-F plastic. Disposed on opposite surfaces of the fritted disc and in the circuit provided by leads 26 and 27 are a pair of identical depolarizing electrodes 28 and 29, as, for example, silver-silver chloride, Ag/AgCl. The electrodes 28 and 29 are connected to a source of current indicated generally at $E(t)$ and applied to the lead terminals 30 and 31. The electrodes 28 and 29 may be supported in adjacency to the glass disc in any suitable manner not shown. If desired, the electrodes 28 and 29 may be of the same diameter as the disc and fitted close to the disc on both sides; the leads 26 and 27 being taken out through the sides of the casing body 12. It is to be understood that the electrodes are also porous masses or of perforated sheet material and permit a substantially free flow of liquid therethrough. A certain amount of hydraulic resistance is necessarily present in this construction of the cell 10. This resistance to fluid flow is presented by the electrodes and the capillaries of the glass disc, and this lumped resistance functions in a manner as generally to be described.

The linear detector body 13 is likewise of Kel-F plastic and provided with a wall 32 for dividing the cell into two chambers 5 and 6. The wall 32 is provided with an opening therethrough at 33. A Kel-F plastic button cathode 34 is sealed into the opening in the center of the wall 33. It is provided with a small orifice 35 and the lead 36 can therefore be taken out through this partition to the outside of the casing. One construction of the cathode consists of a plastic plate 37 of 0.0005" thickness with an 0.015" diameter hole 35 through the center. This hole is backed up by approximately 10 pieces of 150 mesh platinum gauze generally indicated at 38 and held in place by sealing in the Kel-F annular ring 37.

Disposed in the chamber 5 of the detector unit is an anode 40, while the chamber 6 is provided with a separating cathode 41. This chamber is filled with an electrolyte solution of iodine and is located between the stiff diaphragm 20 and the partition wall 32. This is a platinum electrode which is connected to an external circuit in a manner to be provided a positive bias by the battery indicated at 42. This battery advantageously provides a potential of approximately 0.9 volt. A second electrode 41 hereinafter designated as the separating cathode is disposed in the chamber 6 provided between the opposite face of the partition wall 32 and the outer flexible bulged diaphragm 21. This separating cathode 41 along with the main cathode at 38 are of negative polarity with respect to the anode 40. The derivative output of the circuit appears across the terminals 45 and 46 of leads 43 and 44 and as shown is connected through a microammeter for the measurement of the current flow. This microammeter provides continuity of the circuit from the anode to the cathode and provides a load resistance across which a derivative voltage signal may be obtained and by means of which the current flow may be measured.

Prior to the operation of the detector unit 11, which is biased at a voltage of 0.9 volt with electrodes 38 and 41 negative with respect to electrode 40, the cell is allowed to stand for approximately 2 days during which time iodine molecules will be transferred electrochemically from the output side of the detector containing electrode 41 to the input side containing electrode 40. The electrolyte solution in the separating cathode side chamber 6 will then be very dilute in iodine while that in the anode chamber side 5 will be quite concentrated. Thereafter when the device is placed in operation its function is such that fluid in the electro-osmostic cell flows in a direction toward the negative osmostic electrode 29 when a voltage is impressed across the electrodes 28 and 29. Referring now to FIGS. 2 and 3, this electrolytically produced hydraulic pressure is proportional to the voltage applied to the cell. The resultant flow of fluid in the combined system is restricted by the total acoustical resistance hereinafter referred to as ($R_a$), of the fritted glass disc 24 and the detector cathode elements 35 and 38. The flow acting through this acoustic resistance functions to effectively charge the acoustical capacitance as provided by the diaphragm systems of the two combined cells and will eventually charge this series condenser arrangement to fully distend diaphragm 20, and will eventually stop the flow for any constant impressed voltage. The current I picked up in the electrode circuit of 40 and 38 is linear with the flow of the electrolyte solution through the cathode orifice 35 provided the flow is from the concentrated side to the diluted side, i.e. chambers 5 to 6, except that there is a small background current present under no flow conditions. The output current derived therefrom is the time derivative of the voltage $E(t)$ impressed across the electro-osmotic cell electrodes, with a time constant $R_a C_a$ of the acoustic system.

After a voltage has been impressed across the electro-osmotic cell and the fluid allowed to flow, there is an increasing pressure produced across the condenser. When the voltage is reduced or removed from the osmotic cell, pressure across the condenser forces the fluid to flow in the opposite direction until the pressure drop is relieved. The detector current does not increase above background when this back-flow occurs since a dilute electrolyte solution is flowing through the cathode orifice 35. It is to be understood that the unit may be operated in such a way that a positive voltage of the electro-osmotic cell may produce a flow of dilute solution through the cathode orifice 35 and when the voltage is reduced the back-flow will produce a detector current across the anode, main cathode circuit of the linear detector cell and produce a detector current proportional to this flow.

It is to be understood that the fritted disc may be held in place by heat sealing it to the plastic and that the cell bodies can be of a machined or molded configuration. The seals may be obtained by heating after the filling of the space between the diaphragms 19' and 20 of the electro-osmotic cell and the detector cell has been completed. If heat sealing is used to fit these two cell units together the O ring 17 may be omitted.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a derivative cell device of the character described, the combination of an electro-osmotic driving cell for producing a fluid flow in response to an input current applied thereto, and a linear electrolytic detecting cell coupled to said electro-osmotic cell to provide an output signal proportional to the first derivative with respect to time of said input current.

2. An electro-acoustic system for taking the time derivative of small electrical currents, comprising a circuit having an electro-osmotic driving cell connected for application of an input current thereto for providing hydraulic fluid flow therein, and a linear electrolytic detector cell coupled to said first named cell for providing an electrical output signal proportional to the time derivative of said input current in response to fluid flow therein as produced by hydraulic fluid flow in said electro-osmotic cell.

3. A hydro-acoustic derivative taking analogic circuit of a character analagous to a fluctuating D.C. potential source connected to charge a series capacitance through a series resistance, which comprises a source of signal current potential, an electro-osmotic driver cell, and an hydraulically driven electrolytic linear detector cell acoustically coupled thereto and of a character for providing an output proportional to the time derivative of said input signal current.

4. The combination of an electro-osmotic driver cell, a linear detector cell, and means for providing hydro-acoustic coupling between said cells whereby an output voltage proportional to the first time derivative of a signal voltage applied to said electro-osmotic cell may be obtained at the output of the linear detector cell.

5. In combination, an electro-osmotic cell, and means hydro-acoustically coupled thereto for deriving an output signal proportional to the time derivative of an input signal applied to said electro-osmotic cell, said means comprising a closed cell filled with an electrolytic solution, a plurality of electrodes comprising an anode and at least two cathodes disposed in said closed cell in contact with said solution, an electrical circuit including a source of bias potential connected between said anode and one of said cathodes, and a circuit for obtaining a linear output with electrolyte flow between said anode and a second one of said plurality of cathodes.

6. An apparatus of the character described comprising an electro-osmotic cell enclosed by a pair of diaphragms, a pair of depolarizing electrodes disposed therein, an electrolytic linear detector cell enclosed by a second pair of diaphragms, mutual coupling means disposed between the adjacent diaphragms of said cells, and detector electrodes comprising an anode and an orifice type detector cathode in said electrolytic detector cell, so disposed and connected as to provide an output signal proportional to the first time derivative of the applied input current flowing in the circuit of said depolarizing electrodes.

7. The apparatus of claim 6 further characterized by the inclusion of a separating cathode in said detector cell in addition to the detecting anode and cathode therein, a source of biasing potential connected between said anode and said separating cathode for providing an initial differential in ion concentration in the cell and on opposite sides of said detecting cathode, and a partition member carrying said detector cathode for dividing said electrolytic cell into a pair of chambers which are of differing electrolytic concentrations after an initial ion separation as effected by said biasing source.

8. In combination in a hydro-acoustic derivative circuit, an electro-osmotic cell, a linear electrolytic detector cell, and mutual coupling means disposed therebetween in a manner whereby said electro-osmotic cell functions to hydraulically drive said detector cell under electrical input energization applied thereto, said detector cell having a system of electrodes connected to provide an output voltage proportional to the first derivative of the voltage applied to said electro-osmotic cell with hydro-acoustic coupled driving energization thereof.

9. The combination of an electro-osmotic driver cell adapted for energization from an electrical power source external thereto and a linear electrolytic detector cell, said cells being mutually hydraulically inter-connected, and means for obtaining therefrom an output voltage from the detector cell which is proportional to the first derivative of the energization voltage for said driver cell.

References Cited in the file of this patent

UNITED STATES PATENTS

| | | |
|---|---|---|
| 2,661,430 | Hardway | Dec. 1, 1953 |
| 2,685,025 | Root | July 27, 1954 |